(12) United States Patent
Jackson et al.

(10) Patent No.: US 10,536,448 B2
(45) Date of Patent: Jan. 14, 2020

(54) END POINT REPUTATION CREDENTIAL FOR CONTROLLING NETWORK ACCESS

(71) Applicant: International Business Machines Corporation, Armonk, NY (US)

(72) Inventors: Vernon A. Jackson, Reedy Creek (AU); Andrew R. Larsen, Palm Beach (AU); Glen J. Leeder, Currumbin Waters (AU); Gregory O. McCane, Gold Coast City (AU); Anand Rathi, Southport (AU)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/748,362

(22) Filed: Jun. 24, 2015

(65) Prior Publication Data

US 2016/0381022 A1 Dec. 29, 2016

(51) Int. Cl.
| H04L 29/06 | (2006.01) |
| G06F 17/30 | (2006.01) |
| G06F 15/16 | (2006.01) |
| G06F 7/04 | (2006.01) |

(52) U.S. Cl.
CPC .................. H04L 63/083 (2013.01)

(58) Field of Classification Search
CPC ... H04L 63/10; H04L 63/0815; H04L 63/083; H04L 63/1458
USPC ........................................................... 726/7
See application file for complete search history.

(56) References Cited

U.S. PATENT DOCUMENTS

| 8,179,798 | B2 | 5/2012 | Alperovitch et al. |
| 8,424,072 | B2 | 4/2013 | Pullikottil et al. |
| 8,484,730 | B1* | 7/2013 | P. R. .................. G06F 11/3438 709/225 |
| 9,465,505 | B1* | 10/2016 | Moody .................. G06F 3/048 |
| 2008/0114709 | A1* | 5/2008 | Dixon .................. G06Q 10/06 706/13 |
| 2008/0175226 | A1* | 7/2008 | Alperovitch .......... H04L 12/585 370/352 |
| 2011/0185436 | A1* | 7/2011 | Koulinitch .......... G06F 21/6218 726/28 |

(Continued)

FOREIGN PATENT DOCUMENTS

| WO | 2012058066 A1 | 5/2012 |
| WO | 2014078569 A1 | 5/2014 |

OTHER PUBLICATIONS

Farag Azzedin; Integrating Trust into Grid Resource Management Systems; University of Manitoba and TRLabs Winnipeg, Manitoba Canada, Year:2002; p. 1-8.*

(Continued)

*Primary Examiner* — Monjur Rahim
(74) *Attorney, Agent, or Firm* — Stephanie L. Carusillo; Alexander G. Jochym (57) ABSTRACT

In an approach for controlling access to a resource a processor monitors a first set of traffic of a computing device. A processor calculates reputation based on the first set of traffic of the computing device. A processor associates the reputation with the computing device. A processor receives a request to access a resource from the computing device. A processor determines whether the computing device shall be granted access to the resource based on the reputation.

16 Claims, 4 Drawing Sheets

(56) References Cited

U.S. PATENT DOCUMENTS

| | | | |
|---|---|---|---|
| 2011/0225644 A1* | 9/2011 | Pullikottil | H04L 63/1425 |
| | | | 726/11 |
| 2012/0109821 A1 | 5/2012 | Barbour et al. | |
| 2013/0061285 A1 | 3/2013 | Donfried et al. | |
| 2014/0208394 A1 | 7/2014 | Goodwin | |
| 2015/0304329 A1* | 10/2015 | Yan | H04L 67/10 |
| | | | 726/27 |

OTHER PUBLICATIONS

Boschi, et al.; "IP Flow Information Export (IPFIX) Implementation Guidelines"; Networking Work Group; pp. 1-35; <http://tools.ietf.org/html/rfc5153>.

\* cited by examiner

END POINT REPUTATION CREDENTIAL FOR CONTROLLING NETWORK ACCESS

BACKGROUND

The present invention relates generally to the field of network access, and more particularly to controlling the network access through reputation based credentials.

Network access control (NAC) is an approach to computer network security that attempts to unify endpoint security technology, user or system authentication, and network security enforcement. When a computer connects to a computer network, the computer is not permitted to access a number of systems, databases, or applications until the computer complies with a defined policy. This defined policy may be, for example, anti-virus protection, system updates, or specific configuration setups. Once the policies are met, the computer is able to access network resources within the policies defined within the NAC system. NAC is mainly used for endpoint health checks, but the NAC is often tied to Role-based Access. Access to the network is given according to profile of the person and the results of a posture/health check.

Single sign on (SSO) is a type of NAC which is used to gain access to multiple related but independent systems. A user logs on once but gains access to the systems without having to re-authenticate. SSO uses different authentications mechanisms for different systems. This means the SSO implementation must be able translate and store different sets of credentials compared to the initial set used for implementation. SSO solutions therefore only tend to support a subset of common systems or applications. Deploying enterprise wide single sign on may be difficult and expensive and does not work for applications or systems that the SSO implementation does not know about.

Password managers are a type of software to help a user store passwords. Many password managers also work as form fillers so that credential data is automatically populated into credential fields. A typical example is highlighted by web browsers that offer to store credentials required to access particular web applications. Web browsers tend to not support non-web applications. Non-web applications also may not support the same kind of forms that are prevalent with web applications. The user is no longer required to remember any passwords. This causes issues when the time to change a password comes, due to a company's password policy.

Passwordless secure shell (SSH) is a mechanism which enables users to logon to a system based upon SSH keys. SSH keys serve as a means of identifying a computer to an SSH server using public-key cryptography and challenge-response authentication. This method may be authenticated by the server without ever having to send your password over the network. Anyone eavesdropping on a connection is not able to intercept and crack your password because the password is never actually transmitted. Additionally, using SSH keys for authentication virtually eliminates the risk posed by brute-force password attacks by drastically reducing the chances of the attacker correctly guessing the proper credentials. The SSH key mechanism does not have a necessity to specify a passphrase when generating the keys.

SUMMARY

Embodiments of the present invention disclose a method, a computer program product, and a computer system for controlling access to a resource. A processor monitors a first set of traffic of a computing device. A processor for calculates a reputation based on the first set of traffic of the computing device. A processor associates the reputation with the computing device. A processor receives a request to access a resource from the computing device. A processor determines whether the computing device shall be granted access to the resource based on the reputation.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention discloses an approach to control resource access without user provided identity credentials.

The present invention will now be described in detail with reference to the Figures.

Figure 1:
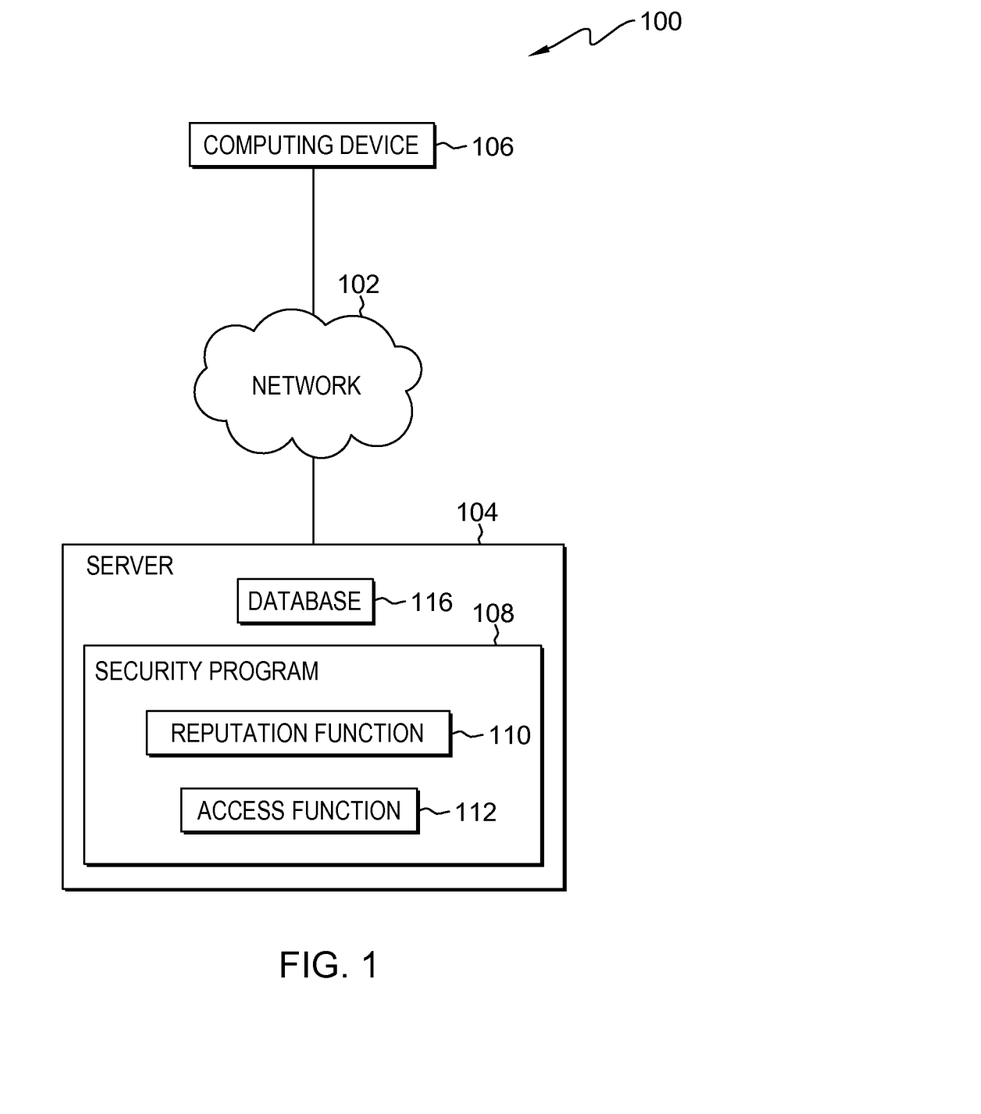
FIG. 1 depicts a block diagram depicting a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to, network 102, server 104, and computing device 106. Computing environment 100 may include additional computing devices, servers, computers, components, or additional devices not shown. It should be appreciated FIG. 1 provides only an illustration of one implementation and does not imply any limitations with regard to the environments in which different embodiments may be implemented. Many modifications to the depicted environment may be made.

Network 102 may be a local area network (LAN), a wide area network (WAN) such as the Internet, any combination thereof, or any combination of connections and protocols support communications between server 104 and computing device 106 in accordance with embodiments of the invention. Network 102 may include wired, wireless, or fiber optic connections.

Server 104 may be a management server, a web server, or additional electronic device or computing system capable of processing program instructions and receiving and sending data. In other embodiments, server 104 may be a laptop computer, tablet computer, netbook computer, personal computer (PC), desktop computer, or any programmable electronic device capable of communicating with additional devices via network 102. In additional embodiments, server 104 may represent a server computing system utilizing multiple computers as a server system, such as in a cloud computing environment. In other embodiments, server 104 represents a computing system utilizing clustered computers and nodes to act as a single pool of seamless resources. In the depicted embodiment, server 104 includes security program 108 and database 116. In additional embodiments, server 104 may include additional programs, storage devices, or components. Server 104 may include components, as depicted and described in further detail with respect to FIG. 5.

Computing device 106 may be a desktop computer, laptop computer, tablet computer, netbook computer, personal computer (PC), a desktop computer, mobile device, or any programmable electronic device capable of communicating via network 102. In additional embodiments, user computing device 106 may be any electronic device or computing system capable of sending and receiving data, and communicating with server 104 via network 102. In the depicted embodiment, user computing device 106 communicates with server 104 via network 102. In one embodiment, a third party assigns a reputation to computing device 106. In another embodiment, security program 108 assigns an initial reputation to computing device 106

Security program 108 controls the creation of a reputation for computing device 106, the formulation and modification of the reputation of computing device 106 and access to the resources dependent on the reputation of computing device 106. Security program 108 formulates the reputation through interception and inspecting of traffic through computing device 106. Security program 108 uses the reputation to identify computing device 106. In other embodiments, security program 108 uses the reputation to identify a user or a group of users using computing device 106 or additional computing devices. Security program 108 formulates the reputation of computing device 106 and the reputation gives computing device 106 a rating which controls the resources computing device 106 has access to. Examples of resources are the Internet, specific web pages, databases, email programs, and additional programs which are stored on computing device 106 or are accessible by computing device 106 via network 102. Security program 108 determines if computing device 106 can access various resources based on the reputation of computing device 106. In other embodiments, Security program 108 formulates the reputation from the reputation, and is used to identify a user or a group of users operating computing device 106 or additional computing devices. In the depicted embodiment, security program 108 is located on server 104. In additional embodiments, security program 108 may be located on additional servers provided security program 108 has access to database 116. In the depicted embodiment, security program 108 includes reputation function 110 and access function 112. In other embodiments, reputation function 110 and access function 112 may be functions of additional programs, or standalone programs located on server 104 or additional servers, or computing devices, provided reputation function 110, and access function 112 are each accessible to security program 108.

Reputation function 110 monitors the traffic of computing device 106 and formulates a reputation for computing device 106. Reputation function 110 monitors the traffic data computing device 106 receives and sends. The traffic data may be, for example, webpages visited, applications used, servers accessed, databases accessed, additional computing devices communicated with, either accessing computing device 106, which computing device 106 is accessing, or other resources. In one embodiment, Reputation function 110 stores the traffic data in a repository, for example, database 116. The stored traffic data is used to formulate a reputation for computing device 106. Reputation function 110 formulates the reputation through calculating a value dependent on the stored data. In other embodiments, reputation function 110 creates the traffic data and uses it to create the signature and does not store the data. In other embodiments, reputation function 110 monitors the traffic of a user. Reputation function 110 monitors the user's traffic through computing device 106 or additional computing devices. Reputation function 110 records the traffic data from the computing devices and the reputation is associated with the user. In the depicted embodiment, reputation function 110 is a function of security program 108. In other embodiments, reputation function 110 may stand alone as a program located on server 104, or an additional computing device, provided reputation function 110 is accessible to security program 108.

Reputation function 110 calculates the reputation for computing device 106 dependent on the reputation calculated by reputation function 110. The reputation is a value which permits computing device 106 to access resources. Computing device 106 is permitted or denied access to resources based on the predetermined value associated with each of the resources compared to the calculated reputation value associated with computing device 106. The reputation determines if a user at computing device 106 may access the requested destination. Reputation function 110 also updates and modifies the reputation dependent on the use of computing device 106 either to increase the reputation, or decrease the reputation depending on predetermined guidelines. The predetermined guidelines, may be, for example, visiting an approved webpage or database, or visiting a restricted webpage or application. Reputation function 110 controls the threshold reputation for the reputation to be acceptable or unacceptable for accessing the resources. In additional embodiments, the reputation threshold may be controlled by security program 108 or third party. In other embodiments, reputation function 110 calculates the reputation for a specific user regardless of which computing device the specific user uses.

Access function 112 controls which resource or resources computing device 106 has access to, dependent on the reputation calculated by reputation function 110. Access function 112 has predetermined reputations assigned to a quantity of the resources within network 102. In other embodiments, resources have the same reputation requirement. In additional embodiments, different resources have different reputation requirements. In one embodiment, access function 112 sets the required reputation for each resource. In additional embodiments, security program 108, or a third party, creates the required reputations for the resources. In the depicted embodiment, access function 112 is a function of security program 108. In other embodiments, access function 112 may stand alone as a program located on server 104, or an additional computing device, provided access function 112 is accessible to security program 108.

Database 116 may be a repository which may be written to and/or read by security program 108. In one embodiment, database 116 includes, for example, reputations traffic data for computing device 106, and additional information related to the formulation of reputations or reputations collected by security program 108. In additional embodiments, database 116 may be written to and/or read by security program 108 and/or additional computing devices, servers, computers, components, or additional devices not shown. In one embodiment, database 116 is a database management system (DBMS), used to allow the definition, creation, querying, update, and administration of a database(s). In other embodiments, database 116 is a relationship database management system (RDMS). In the depicted embodiment, database 116 is stored on server 104. In additional embodiments, database 116 may reside on an alternative server, computer, or computing device, provided database 116 is able to communicate with security program 108, computing device 106, and additional devices, programs, and components (not shown).

Figure 2:
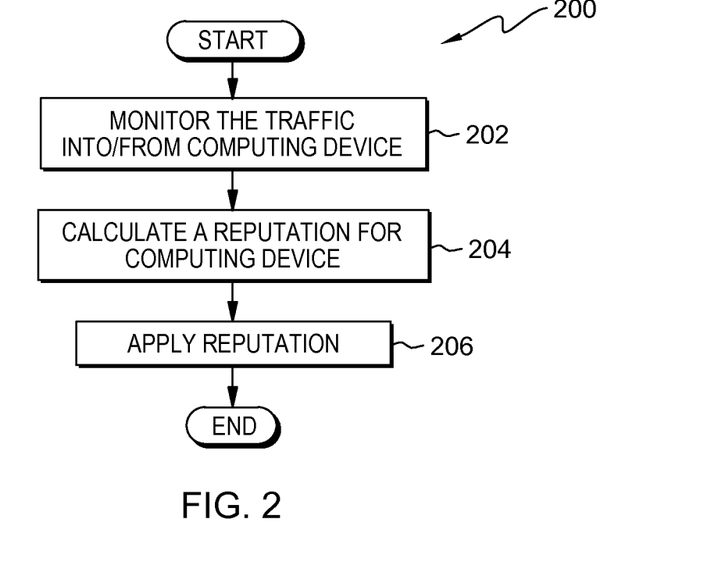
FIG. 2 depicts a flowchart of the operational steps taken by security program to apply a signature to a computing device within computing environment 100 of FIG. 1, in accordance with an embodiment of the present invention.

FIG. 2 depicts a flowchart of the operational steps taken by reputation function 110, a function of security program 108, to apply a signature to computing device 106 within computing environment 100 of FIG. 1, in accordance with an embodiment of the present invention. Flowchart 200 depicts the gathering of traffic data and the calculation of a reputation. It should be appreciated FIG. 2 provides only an illustration of one implementation and does not imply any limitations with regard to the environments in which different embodiments may be implemented. Many modifications to the depicted environment may be made.

In step 202, reputation function 110 monitors the traffic into/from computing device 106. Traffic includes the total volume of cells, blocks, frames, packets, calls, messages, or additional units of data carried over a circuit or network, or processed through computing device 106. In one embodiment, the traffic is the interaction of computing device 106 with devices, resources, and apparatuses within network 102. Traffic may be generated by, for example, visiting webpages, checking both business and personal email, accessing databases or servers, sending data, or receiving data. In one embodiment, reputation function 110 stores the traffic for calculating the reputation for computing device 106 in a repository, for example, database 116. In one embodiment, reputation function 110 monitors a predetermined amount of traffic through computing device 106. In other embodiments, reputation function 110 monitors a predetermined type of traffic through computing device 106. Examples of a predetermined type of traffic are webpages or internet searches which include predetermined trigger words or phrases. The predetermined trigger words or phrases could be, for example, sexually explicit words, profanities, words related to job hunting, words associated with stereotypes, words related to competitors, or additional topics a third party determines are trigger words or phrases. The predetermined trigger word or phrases can have either a positive or a negative connotation associated with each word or phrase. In other embodiments, each action associated with a word/phrase may affect the reputation equally. In other embodiments, certain actions associated with certain words/phrases may affect the reputation to a greater or lesser extent than other actions, based on a predetermined scaling factor. In additional embodiments, the connotation may be scaled, for example, certain actions result in a greater or smaller modification to the reputation than a plus or minus one.

In step 204, reputation function 110 assigns an initial reputation value computing device 106. The initial reputation value is associated with a predetermined amount of traffic of computing device's 106. In one embodiment, the predetermined type of traffic is set by, for example, reputation function 110, security program 108, or a third party. In one embodiment, the reputation is calculated dependent on the presence of the predetermined type of traffic in the overall monitored traffic of computing device 106. For example the presence of positive traffic increases the reputation, while the presence of negative traffic decrease the reputation. The time frame within which reputation function 110 is inspecting the traffic of computing device 106 is adjustable and set by, for example, reputation function 110, security program 108, or a third party. In other embodiments, when computing device 106 is setup and connected to network 102 and traffic is being both received and sent, reputation function 110 generates a generic reputation. In other embodiments, reputation function 110 sets a minimum and maximum threshold value for the reputation value The maximum and minimum values are set by, for example, reputation function 110 security program 108, or a third party.

In step 206, reputation function 110 applies the reputation to computing device 106. Reputation function 110 applies the reputation to computing device 106 to allow, for example, security program 108, reputation function 110, or a third party to access the value for future calculations or to use in additional computations or assessments of computing device 106. In one embodiment, reputation function 110 stores the reputation created for computing device 106 in a repository. In other embodiments, reputation function 110 creates the reputation for computing device 106 in real time. In additional embodiments, reputation function 110 applied the reputation to a user, a group of users, or another entity instead of computing device 106. The application of the reputation to a user or a group of users may be due to specific instances of traffic being sent or received from computing device 106 which security program 108 or a third party determine are necessary to apply to the specific user or users and not computing device 106. Examples of instances may be traffic indicating that a user is making threats, pornographic searches, or search topics related to violence, or terrorism.

Figure 3:
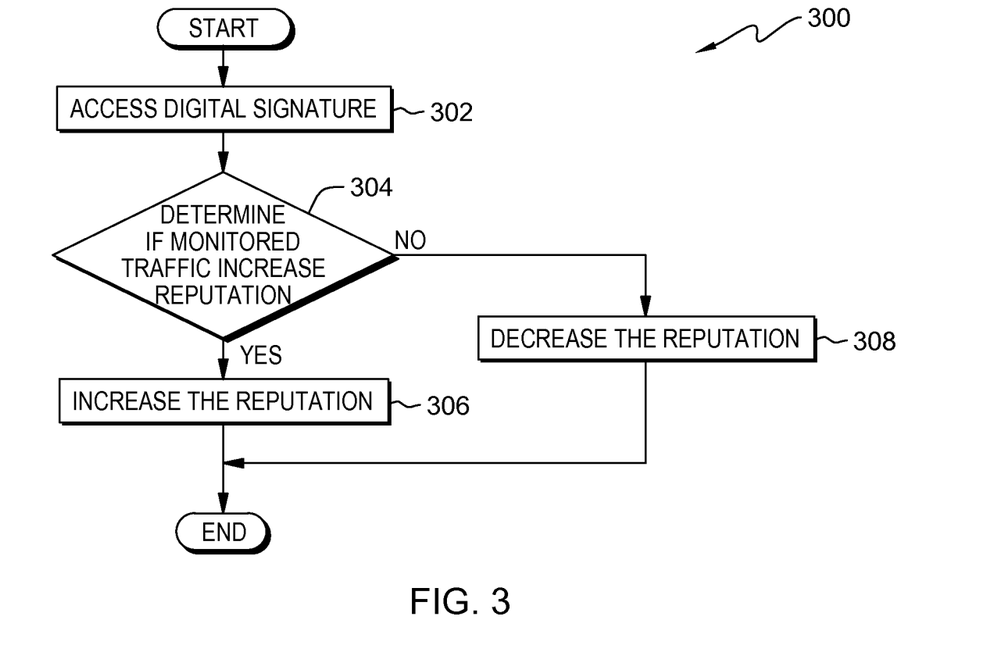
FIG. 3 depicts a flowchart of the operational step taken by security program to adjust the reputation of the computing device within computing environment 100 of FIG. 1, in accordance with an embodiment of the present invention.

FIG. 3 depicts a flowchart of the operational step taken by reputation function 110, a function of security program 108, to adjust the reputation of the computing device within computing environment 100 of FIG. 1, in accordance with an embodiment of the present invention. Flowchart 300 depicts the creation and modification of the reputation. It should be appreciated FIG. 3 provides only an illustration of one implementation and does not imply any limitations with regard to the environments in which different embodiments may be implemented. Many modifications to the depicted environment may be made.

In step 302, reputation function 110 accesses a digital signature. The digital signature can be, for example, related to computing device 106, a user, or a group of users. The digital signature is a mathematical technique used to validate the authenticity and integrity of a message, software, or digital document. Reputation function 110 accesses the reputation created for computing device 106. In one embodiment, reputation function 110 accesses the repository which reputation function 110 stored the reputation for computing device 106. In additional embodiments, reputation function 110 communicates with reputation function 110 as reputation function 110 generates the reputation for computing device 106. In other embodiments, reputation function 110 accesses the reputation for a user or a group of users which reputation function 110 created a reputation for.

In decision 304, reputation function 110 determines if the monitored traffic increases the reputation. Once reputation function 110 generates the reputation, reputation function 110 continues to communicate with reputation function 110 to monitor the traffic of computing device 106. If reputation function 110 determines the monitored traffic does increase the reputation (decision 306, YES branch, proceed to step 308), reputation function 110 increases the reputation. If reputation function 110 determines the monitored traffic does not increase the reputation (decision 306, NO branch, proceed to step 310), reputation function 110 decreases the reputation. In other embodiments, reputation function 110 monitors the traffic of computing device 106. In additional embodiments, reputation function 110 monitors the traffic of specific users or groups of users using computing device 106 or additional computing devices within network 102.

In step 306, reputation function 110 increases the reputation. In other embodiments, reputation function 110 increases the reputation associated with computing device 106. In additional embodiments, reputation function 110 increases the reputation associated with a user or a group of users using computing device 106 or additional computing devices within network 102. In other embodiments, either the computer, the user, or the group of users are designated a digital signature. In other embodiments, reputation function 110 increases the reputation to a maximum. The maximum reputation is set by, for example, security program 108, reputation function 110, reputation function 110, or a third party. In other embodiments, there is no maximum reputation and computing device 106, the user, or the group of users may periodically increase their reputation. In other embodiments, reputation function 110 stores and maintains the calculated reputation in a repository, for example, database 116.

In step 308, reputation function 110 decreases the reputation. In other embodiments, reputation function 110 decreases the reputation of computing device 106. In additional embodiments, reputation function 110 decreases the reputation of a user or a group of users using computing device 106 or additional computing devices within network 102. In other embodiments, reputation function 110 decreases the reputation to a minimum. The minimum reputation is set by, for example, security program 108, reputation function 110, reputation function 110, or a third party. In other embodiments, there is no minimum reputation and computing device 106, the user, or the group of users may periodically have their reputation decrease due to their actions. In other embodiments, when the reputation value reaches a predetermined minimum value, reputation function 110 alerts security program 108 or a third party to report the actions of computing device 106, the user, or the group of users. In other embodiments, reputation function 110 stores and maintains the calculated reputation in a repository, for example, database 116.

Figure 4:
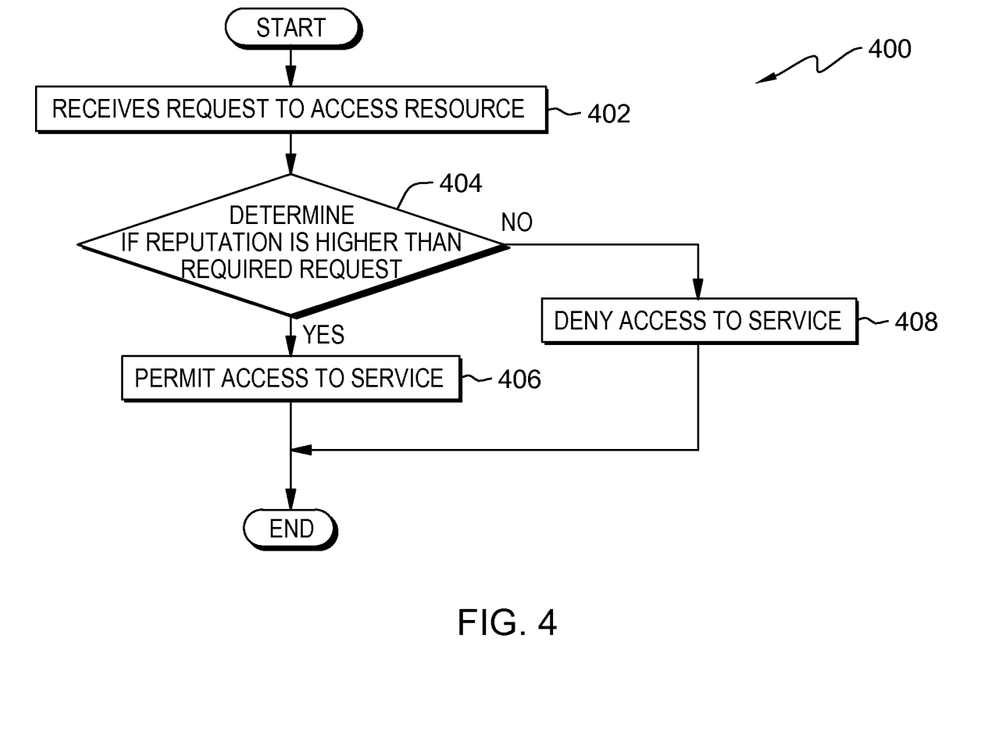
FIG. 4 depicts a flowchart of the operational step taken by security program to allow computing device access to resources dependent on the computing devices reputation, within computing environment 100 of FIG. 1, in accordance with an embodiment of the present invention.

FIG. 4 depicts a flowchart of the operational step taken by access function 112, a function of security program 108, to allow computing device 106 access to resources dependent on the computing devices reputation, within computing environment 100 of FIG. 1, in accordance with an embodiment of the present invention. Flowchart 400 depicts the gathering of traffic data and the calculation of a reputation. It should be appreciated FIG. 4 provides only an illustration of one implementation and does not imply any limitations with regard to the environments in which different embodiments may be implemented. Many modifications to the depicted environment may be made.

In step 402, access function 112 receives request to access resource. Access function 112 receives a request from computing device 106, a user, or a group of users to access a resource. The request can be in the form of computing device 106, the user, or the group of users, for example, attempting to access a web page, attempting to access a program, or attempting to access an email.

In decision 404, access function 112 determines if the reputation is greater than the required reputation. Access function 112 receives a request from computing device 106 to access a resource. In other embodiments, access function 112 receives a request from a user or group of users attempting to access a resource. In determining if the reputation of computing device 106 is greater than the required reputation for the resource, access function 112 accesses a repository where the required reputations, and the digital signature of computing device 106 are stored. The information or data may be stored in a repository, for example, database 116. If access function 112 determines the reputation of computing device 106 is greater than the required reputation (decision 404, YES branch, proceed to step 406), access function 112 allows computing device 106 to access the resource. If access function 112 determines the reputation of computing device 106 is less than the required reputation (decision 404, NO branch, proceed to step 406), access function 112 does not allow computing device 106 access to the resource. In other embodiments, the reputation and the required reputation may be equal, in this instance an equal reputation is considered inadequate and computing device 106 is denies access to the resource.

In step 406, access function 112 permits access to the resource. Access function 112 permits computing device 106 to access the resource. In other embodiments, access function 112 permits a user, or a group of users to access the resource. In one embodiment, access function 112 communicates with reputation function 110 to increase the reputation of computing device 106, the user, or the users if the resource which is being accessed is a resource which increases the reputation. In other embodiments, access function 112 permits a user to user a command to override the denial and allow access. This command can be, for example a password which a manager or supervisor has to allow access to computing device 106.

In step 408, access function 112 denies access to the resource. Access function 112 does not permit computing device 106 to access the resource. In other embodiments, access function 112 does not permits a user, or a group of users to access the resource. In one embodiment, access function 112 communicates with reputation function 110 to decrease the reputation of computing device 106, the user, or the group of users if the resource which being accessed is determined to be a resource which decreases the reputation. In other embodiments, the user is prompted with the opportunity to input another set of credentials to override access function 112. The credentials could be, for example, a master password, a manager's password, or other forms of credentials which can override access function's 114 denial.

Figure 5:
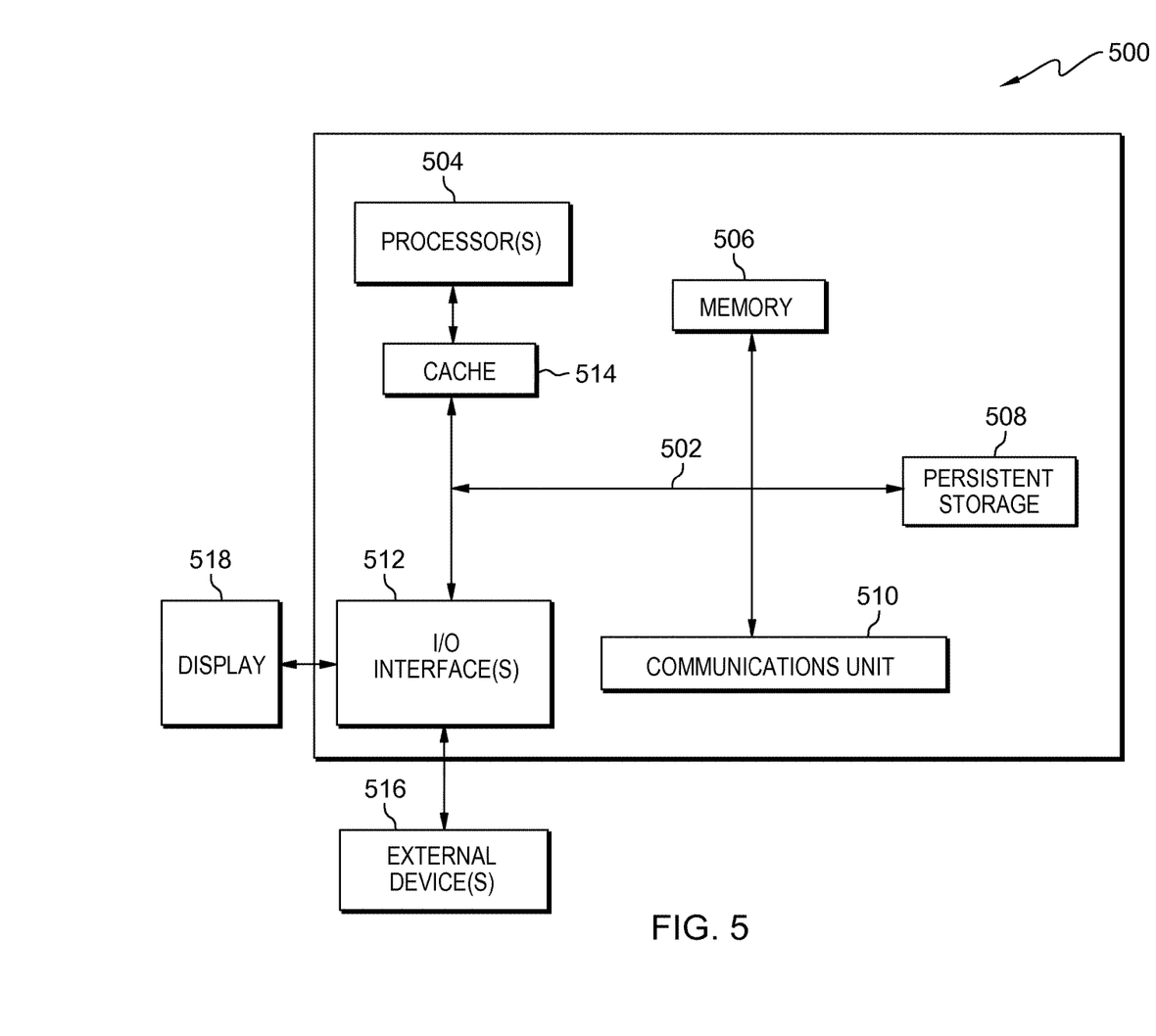
FIG. 5 depicts a block diagram depicting the internal and external components of the server of FIG. 1, in accordance with one embodiment of the present invention.

FIG. 5 depicts a block diagram 500 of components of server 104, in accordance with an illustrative embodiment of the present invention. It should be appreciated FIG. 4 provides only an illustration of one implementation and does not imply any limitations with regard to the environments in which different embodiments may be implemented. Many modifications to the depicted environment may be made.

Server 104 includes communications fabric 502, which provides communications between computer processor(s) 504, memory 506, persistent storage 508, communications unit 510, and input/output (I/O) interface(s) 512. Communications fabric 502 may be implemented with any architecture designed for passing data and/or control information between processors (such as microprocessors, communications and network processors, etc.), system memory, peripheral devices, and any additional hardware components within a system. For example, communications fabric 502 may be implemented with one or more buses.

Memory 506 and persistent storage 508 are computer-readable storage media. In one embodiment, memory 506 includes random access memory (RAM) and cache memory 514. In general, memory 506 can include any suitable volatile or non-volatile computer-readable storage media.

Memory 506 is stored for execution by one or more of the respective computer processors 504 of server 104 via one or more memories of memory 506 of server 104. In the depicted embodiment, persistent storage 508 includes a magnetic hard disk drive. Alternatively, or in addition to a magnetic hard disk drive, persistent storage 508 can include a solid state hard drive, a semiconductor storage device, a read-only memory (ROM), erasable programmable read-only memory (EPROM), flash memory, or any additional computer-readable storage media that is capable of storing program instructions or digital information.

The media used by persistent storage 508 may also be removable. For example, a removable hard drive may be used for persistent storage 508. Additional examples include optical and magnetic disks, thumb drives, and smart cards that are inserted into a drive for transfer onto another computer-readable storage medium that is also part of persistent storage 508.

Communications unit 510, in the examples, provides for communications with additional data processing systems or devices, including server 104. In the examples, communications unit 510 includes one or more network interface cards. Communications unit 510 may provide communications through the use of either or both physical and wireless communications links.

I/O interface(s) 512 allows for input and output of data with additional devices that may be connected to server 104. For example, I/O interface 512 may provide a connection to external devices 516 such as a keyboard, keypad, camera, a touch screen, and/or some additional suitable input device. External devices 516 can also include portable computer-readable storage media such as, for example, thumb drives, portable optical or magnetic disks, and memory cards. Software and data used to practice embodiments of the present invention, e.g., function of security program 108 can be stored on such portable computer-readable storage media and can be loaded onto persistent storage 508 of server 104 via I/O interface(s) 512 of server 104. Software and data used to practice embodiments of the present invention, e.g., security program 108 can be stored on such portable computer-readable storage media and can be loaded onto persistent storage 508 of server 104 via I/O interface(s) 512 of server 104. I/O interface(s) 512 also connect to a display 518.

Display 518 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Resource Provider). In other embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or additional devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling access to a resource, the method comprising:
    monitoring, by one or more hardware processors, a first set of usage of an endpoint computing device within a network, wherein the first set of usage includes usage data received and sent by the endpoint computing device;
    calculating, by one or more hardware processors, an endpoint computing device reputation for the endpoint computing device based on the monitored first set of usage of the endpoint computing device;
    associating, by one or more hardware processors, the endpoint computing device reputation with the endpoint computing device;
    receiving, by one or more hardware processors, a request from the endpoint computing device to access a resource within the network, wherein the resource is at least one of a database, an email program, and a server; and
    determining, by one or more hardware processors, whether the endpoint computing device shall be granted access to the resource based on a comparison of a minimum reputation requirement of the resource to the endpoint computing device reputation;
    monitoring, by one or more hardware processors, a second set of usage of the endpoint computing device;
    determining, by one or more hardware processors, that the second set of usage of the endpoint computing device affects the endpoint computing device reputation;
    adjusting; by one or more hardware processors, the endpoint computing device reputation based on the second set of usage of the endpoint computing device; and
    determining, by one or more hardware processors, whether the endpoint computing device is granted access to the resource based on a comparison of a minimum reputation requirement of the resource to the adjusted endpoint computing device reputation.

2. The method of claim 1, further comprising:
    responsive to determining that the endpoint computing device shall be granted access to the resource, granting, by one or more hardware processors, the endpoint computing device access to the resource.

3. The method of claim 1, further comprising:
    responsive to determining that the endpoint computing device shall not be granted access to the resource, denying, by one or more hardware processors, the endpoint computing device access to the resource.

4. The method of claim 3, further comprising:
    receiving, by one or more hardware processors, a command to override the access denial; and
    granting, by one or more hardware processors, the endpoint computing device access to the resource.

5. The method of claim 3, further comprising:
    generating, by one or more hardware processors, an alert indicating that the endpoint computing device has been denied access to the resource.

6. A computer program product for controlling access to a resource, the computer program product comprising:
    one or more computer readable storage devices and program instructions stored on the one or more computer readable storage devices, the program instructions comprising:
    program instructions to monitor a first set of usage of an endpoint computing device within a network, wherein the first set of usage includes usage data received and sent by the endpoint computing device;
    program instructions to calculate an endpoint computing device reputation for the endpoint computing device based on the monitored first set of usage of the endpoint computing device;
    program instructions to associate the endpoint computing device reputation with the endpoint computing device;
    program instructions to receive a request from the endpoint computing device to access a resource within the network, wherein the resource is at least one of a database, an email program, and a server;

program instructions to determine whether the endpoint computing device shall be granted access to the resource based on a comparison of a minimum reputation requirement of the resource to the endpoint computing device reputation;

program instructions to monitor a second set of usage of the endpoint computing device within the network;

program instructions to determine that the second set of usage of the endpoint computing device affects the endpoint computing device reputation;

program instructions to adjust the endpoint computing device reputation based on the second set of usage of the endpoint computing device; and program instructions to determine whether the endpoint computing device is granted access to the resource based on a comparison of a minimum reputation requirement of the resource to the adjusted endpoint computing device reputation.

7. The computer program product of claim 6, further comprising:

program instructions, stored on the one or more computer readable storage devices, to responsive to the program instructions to determine that the endpoint computing device shall be granted access to the resource, grant the endpoint computing device access to the resource.

8. The computer program product of claim 6, further comprising:

program instructions, stored on the one or more computer readable storage devices, to responsive to the program instructions to determine that the endpoint computing device shall not be granted access to the resource, deny the endpoint computing device access to the resource.

9. The computer program product of claim 8, further comprising:

program instructions, stored on the one or more computer readable storage devices, to receive a command to override the access denial; and program instructions, stored on the one or more computer readable storage devices, to grant the endpoint computing device access to the resource.

10. A computer system for controlling access to a resource, the computer program product comprising:

one or more computer hardware processors, one or more computer readable storage devices, and program instructions stored on the one or more computer readable storage devices for execution by at least one of the one or more hardware processors, the program instructions comprising:

program instructions to monitor a first set of usage of an endpoint computing device within a network, wherein the first set of usage includes usage data received and sent by the endpoint computing device;

program instructions to calculate an endpoint computing device reputation for the endpoint computing device based on the monitored first set of usage of the endpoint computing device;

program instructions to associate the endpoint computing device reputation with the endpoint computing device;

program instructions to receive a request from the endpoint computing device to access a resource within the network, wherein the resource is at least one of a database, an email program, and a server; and program instructions to determine whether the endpoint computing device shall be granted access to the resource based on a comparison of a minimum reputation requirement of the resource to the endpoint computing device reputation;

program instructions to monitor a second set of usage of the endpoint computing device within the network;

program instructions to determine that the second set of usage of the endpoint computing device affects the endpoint computing device reputation;

program instructions to adjust the endpoint computing device reputation based on the second set of usage of the endpoint computing device; and program instructions to determine whether the endpoint computing device is granted access to the resource based on a comparison of a minimum reputation requirement of the resource to the adjusted endpoint computing device reputation.

11. The computer system of claim 10, further comprising:

program instructions, stored on the one or more computer readable storage devices for execution by at least one of the one or more hardware processors, to responsive to the program instructions to determine that the endpoint computing device shall be granted access to the resource, grant the endpoint computing device access to the resource.

12. The computer system of claim 10, further comprising:

program instructions, stored on the one or more computer readable storage devices for execution by at least one of the one or more hardware processors, to responsive to the program instructions to determine that the endpoint computing device shall not be granted access to the resource, deny the endpoint computing device access to the resource.

13. The computer system of claim 12, further comprising:

program instructions, stored on the one or more computer readable storage devices for execution by at least one of the one or more hardware processors, to receive a command to override the access denial; and program instructions, stored on the one or more computer readable storage devices for execution by at least one of the one or more hardware processors, to grant the endpoint computing device access to the resource.

14. The method of claim 1, wherein usage data comprises a website visited, an application used, a server accessed, a database accessed, and an additional computing device communicated with.

15. The method of claim 1, wherein the second set of usage of the endpoint computing device comprises positive usage, wherein positive usage comprises visiting an approved webpage and accessing an approved database.

16. The method of claim 1, wherein the second set of usage of the endpoint computing device comprises negative usage, wherein negative usage comprises visiting a restricted webpage and using a restricted application, wherein the restricted webpage includes a predetermined trigger word selected from the group consisting of sexually explicit words, profanities, words related to job hunting, words associated with stereotypes, and words related to competitors.

* * * * *